(12) United States Patent
Callahan et al.

(10) Patent No.: US 11,168,489 B2
(45) Date of Patent: Nov. 9, 2021

(54) MESH FENCE MATERIAL AND METHOD FOR MAKING THEREOF

(71) Applicant: Cover Care, LLC, Westfield, IN (US)

(72) Inventors: Thomas Callahan, Nampa, ID (US); Patrick Callahan, Escondido, CA (US)

(73) Assignee: Cover Care, LLC, Westfield, IN (US)

( * ) Notice: Subject to any disclaimer, the term of this patent is extended or adjusted under 35 U.S.C. 154(b) by 615 days.

(21) Appl. No.: 14/978,777

(22) Filed: Dec. 22, 2015

(65) Prior Publication Data

US 2016/0177594 A1 Jun. 23, 2016

Related U.S. Application Data

(60) Provisional application No. 62/095,329, filed on Dec. 22, 2014.

(51) Int. Cl.
| | |
|---|---|
| *E04H 17/04* | (2006.01) |
| *E04H 17/16* | (2006.01) |
| *B29C 65/10* | (2006.01) |
| *B29C 65/00* | (2006.01) |
| *G01B 11/25* | (2006.01) |
| *G01B 21/04* | (2006.01) |
| *H04N 9/31* | (2006.01) |
| *H04N 9/67* | (2006.01) |
| *B29C 65/14* | (2006.01) |

(Continued)

(52) U.S. Cl.
CPC ............ *E04H 17/04* (2013.01); *B29C 65/103* (2013.01); *B29C 66/1122* (2013.01); *B29C 66/304* (2013.01); *B29C 66/472* (2013.01); *B29C 66/723* (2013.01); *B29C 66/81465* (2013.01); *B29C 66/83411* (2013.01); *E04H 17/05* (2021.01); *E04H 17/161* (2013.01); *E04H 17/163* (2013.01); *G01B 11/2504* (2013.01); *G01B 11/2545* (2013.01); *G01B 21/042* (2013.01); *H04N 9/3185* (2013.01); *H04N 9/3194* (2013.01); *H04N 9/67* (2013.01); *B29C 65/1412* (2013.01); *B29C 65/1425* (2013.01); *B29C 65/483* (2013.01); *B29C 65/4815* (2013.01); *B29C 65/522* (2013.01); *B29C 65/62* (2013.01); *B29C 66/431* (2013.01); *B29C 66/71* (2013.01); *B29C 66/712* (2013.01); *B29C 66/729* (2013.01); *B29C 66/742* (2013.01); *B29C 66/919* (2013.01); *B29C 66/92451* (2013.01); *B29C 66/949* (2013.01); *B29C 66/9441* (2013.01); *B29C 66/9534* (2013.01); *B29C 2035/046* (2013.01); *B29C 2035/0822* (2013.01); *B29C 2035/0855* (2013.01); *B29L 2028/00* (2013.01); *B29L 2031/73* (2013.01)

(58) Field of Classification Search
CPC ......... E04H 17/02; E04H 17/04; E04H 17/16; E04H 17/161; E04H 17/163
See application file for complete search history.

(56) References Cited

U.S. PATENT DOCUMENTS 265,302 A * 10/1882 Brigham ................. B44D 3/18
746,403 A 12/1903 Tarney
(Continued)

*Primary Examiner* — Michael P Ferguson
(74) *Attorney, Agent, or Firm* — Taylor IP, P.C.

(57) ABSTRACT

A fencing material includes a border material including a first polymer and having an interior surface; and a mesh material having a front and a back, a portion of at least one of the front and the back being bonded to the interior surface of the border material.

11 Claims, 2 Drawing Sheets

(51) Int. Cl.
*B29C 65/48* (2006.01)
*B29C 65/52* (2006.01)
*B29C 65/62* (2006.01)
*B29C 35/04* (2006.01)
*B29C 35/08* (2006.01)
*B29L 28/00* (2006.01)
*B29L 31/00* (2006.01)

(56) References Cited

U.S. PATENT DOCUMENTS

| | | | | |
|---|---|---|---|---|
| 1,608,667 | A | | 11/1926 | Poetsch |
| 1,906,500 | A | | 5/1933 | Twitchell |
| 2,578,889 | A | | 12/1951 | Kennedy |
| 2,659,958 | A | * | 11/1953 | Johnson .................. D21F 1/10 139/425 A |
| 3,047,860 | A | * | 7/1962 | Swallow .............. H01Q 15/142 139/425 R |
| 3,347,527 | A | * | 10/1967 | Andrews .................. E01F 7/02 256/12.5 |
| 3,689,067 | A | * | 9/1972 | Bramley ................ D04H 3/045 156/202 |
| 4,380,327 | A | * | 4/1983 | Fish ........................ E04H 17/06 256/24 |
| 4,534,819 | A | | 8/1985 | Payet et al. |
| 4,605,578 | A | | 8/1986 | Emrich et al. |
| 4,755,242 | A | | 7/1988 | Miller et al. |
| 5,052,686 | A | * | 10/1991 | Pryor .................. A63B 61/003 473/494 |
| 5,061,331 | A | | 10/1991 | Gute |
| 5,152,508 | A | * | 10/1992 | Fish ........................ E04H 17/16 256/24 |
| 5,201,497 | A | * | 4/1993 | Williams ................ E04H 17/02 256/12.5 |
| 5,553,833 | A | | 9/1996 | Bohen |
| 6,076,448 | A | | 6/2000 | Rexroad |
| 6,185,908 | B1 | | 2/2001 | Madderom |
| 6,893,007 | B2 | | 5/2005 | Asenbauer |
| 6,932,510 | B2 | * | 8/2005 | Sway .................... B65D 29/00 383/102 |
| 7,219,709 | B1 | | 5/2007 | Williams |
| 2006/0060831 | A1 | * | 3/2006 | Seas ........................ E04H 17/16 256/24 |
| 2008/0011993 | A1 | * | 1/2008 | Sadinsky ............. E04H 17/161 256/25 |

* cited by examiner

MESH FENCE MATERIAL AND METHOD FOR MAKING THEREOF

CROSS REFERENCE TO RELATED APPLICATIONS

This is a non-provisional application based upon U.S. provisional patent application Ser. No. 62/095,329, entitled "MESH FENCE MATERIAL AND METHOD FOR MAKING THEREOF", filed Dec. 22, 2014, which is incorporated herein by reference.

BACKGROUND OF THE INVENTION

1. Field of the Invention

The present invention relates to fence materials, and, more particularly, to mesh fence materials.

2. Description of the Related Art

Safety pool fences, which can be made of mesh, are designed to surround a pool area and prevent young children, debris and animals from entering the pool area. The safety pool fence can be designed to be removable, or can be intended as a fixture in the ground.

Current safety pool fence products consist of a series of poles with material stretched between the pools. The safety pool fences can assume heights of between 4 and 5 feet. The safety pool fence typically consists of several sections, with each section typically being between 10 to 15 feet long and linked together to form the complete fence. The material stretched between the poles is made from mesh fabric with a border attached to the mesh by stitching. The border material can be a variety of materials including cloth, synthetic webbing, and vinyl.

The border material is an important component of a safety pool fence and if the material undergoes excessive stretching/contracting or is poorly attached to the mesh fabric, it can cause the fence to have an unappealing appearance or become unsafe. Specifically, excessive stretching or contracting of the border can cause the fence to become unsafe by causing the fence gate to become misaligned and not close properly, or fail to serve as a self-latching gate. The border can also cause a safety problem if not properly attached because the fence would become loose and easier for a young child to climb. Known border materials are attached to the mesh fabric using stitching, with either two or three stitches running the full length of the mesh webbing. Stitching can miss parts of the mesh material and is prone to weathering by the sun, which can cause failure of the stitching and border material.

What is needed in the art is an improved fence material that is less prone to failure.

SUMMARY OF THE INVENTION

The present invention provides a fencing material with a border material that is bonded to a mesh material.

The invention in one form is directed to a fencing material including a border material comprising a first polymer and having an interior surface; and a mesh material having a front and a back, a portion of at least one of the front and the back being bonded to the interior surface of the border material.

The invention in another form is directed to a fence including at least two fencing poles; and a fencing material connected to the at least two fencing poles. The fencing material includes a border material comprising a first polymer and having an interior surface; and a mesh material having a front and a back, a portion of at least one of the front and the back being bonded to the interior surface of the border material.

The invention in yet another form is directed to a method for producing a fencing material including the steps of: providing a border material having an interior surface; providing a mesh material having a front and a back; treating the interior surface of the border material to produce a tacky border material surface; placing a portion of at least one of the front and the back of the mesh material against the tacky border material surface; and pressing the tacky border material surface and the mesh material together.

An advantage of the present invention is the fencing material is less prone to the mesh separating from the border material than sewn materials.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
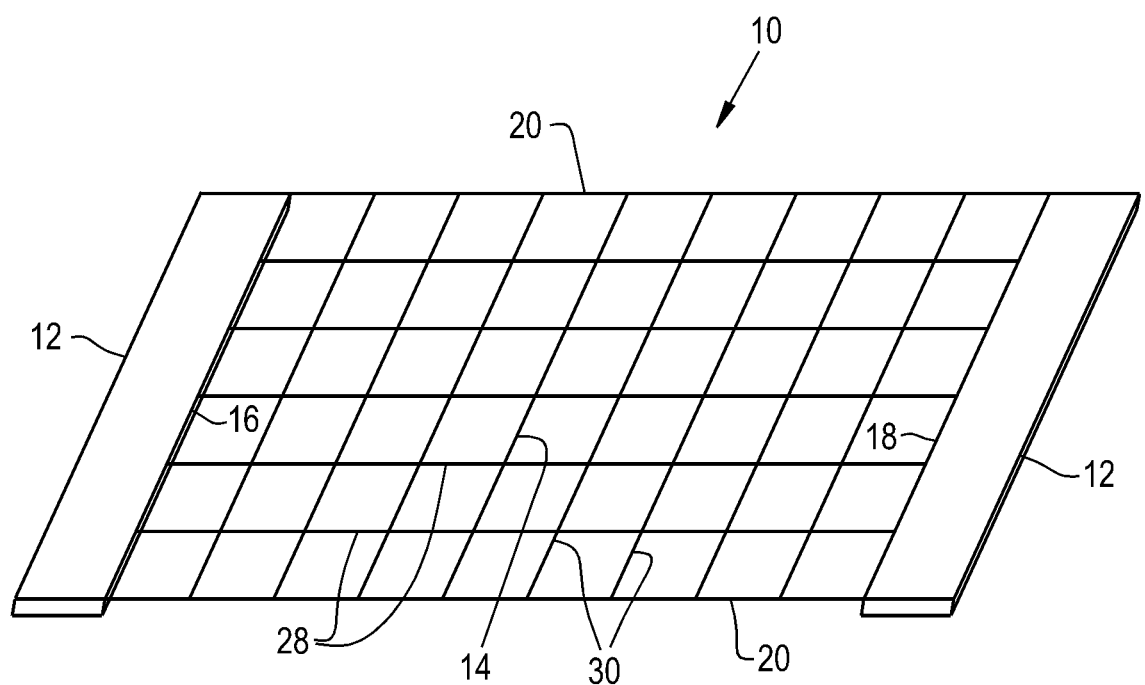
FIG. 1 is a perspective view of an embodiment of a fencing material formed according to the present invention.

Referring now to the drawings, and more particularly to FIG. 1, an embodiment of a fencing material 10 formed according to the present invention is shown which generally includes a border material 12 comprising a polymer material, such as vinyl, and a mesh material 14 bonded to the border material 12. As can be seen, the fencing material 10 can have border material 12 bonded to two opposite edges of the mesh material 14, such as a top edge 16 and a bottom edge 18 of the mesh material 14. As used herein, the top edge 16 and bottom edge 18 of the mesh material 14 refer to the edges of the mesh material 14 that extend along a length of the mesh material 14, and are only used to describe relative orientations of the mesh material 14. It should be appreciated that the border material 12 can also be bonded to lateral edges 20 of the mesh material 14 in addition to or in place of the top edge 16 and bottom edge 18.

Figure 4:
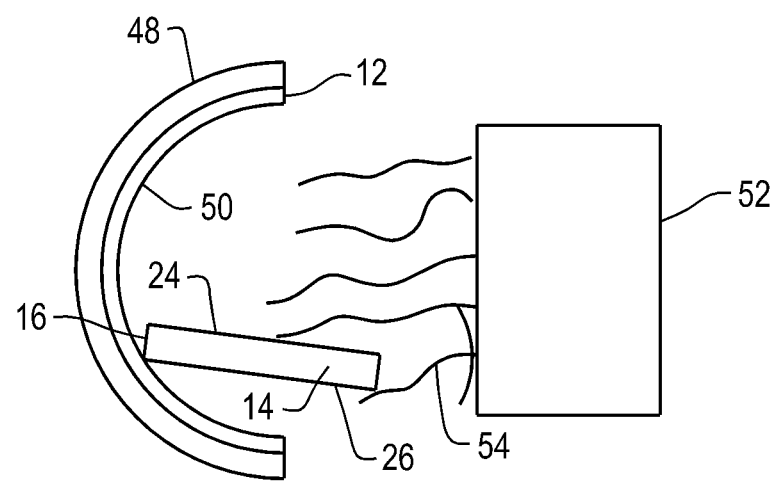
FIG. 4 is cross-sectional view of the fencing material shown as being manufactured in FIG. 3 taken along line 4-4.

The border material 12 can be formed of a vinyl, such as polyvinyl chloride (PVC), or other polymers that can form a bond to the mesh material 14, as described further herein. If the border material 12 is vinyl, the vinyl can have a weight 10 to 20 ounces per square yard and be laminated or coated. The thickness and width of the border material 12 can be altered to give desired aesthetic and functional characteristics to the fencing material 10, with exemplary widths of the border material 12 being between 1 and 4 inches. While shown as being substantially solid with possible microscopic pores formed therein, the border material 12 can also be formed to have macroscopic openings formed therein to accommodate insertion of objects through the border material 12, such as mounting screws 22 shown in FIG. 2. The border material 12 shown in FIG. 1 can be folded over the edges 16, 18 of the mesh material 14 prior to bonding so the border material 12 sandwiches a front 24 of the mesh material 14 and a back 26 of the mesh material 14, which are illustrated in FIG. 4, inside the border material 12. In this sense, the border material 12 can completely envelop portions of the front 24 and back 26 of the mesh material 14 adjacent the top edge 16 and bottom edge 18 to produce a strong bond between the mesh material 14 and the border material 12.

The mesh material 14, on the other hand, can be formed as a lattice grid having multiple horizontal threads 28 interlaced with multiple vertical threads 30. It should be appreciated that while the mesh material 14 is described as having threads 28 and 30, which imply cloth or polymer construction, the "threads" 28 and 30 of the mesh material 14 can be formed of any desired material to produce the mesh such as polymer, cloth, metal, etc. If the mesh material 14 is formed of a polymer, the chosen polymer can be the same or a different polymer from the polymer forming the border material 12. The mesh material 14 can be, for example, formed of PVC or be a non-vinyl material coated with vinyl. The spacing and shapes formed between adjacent threads 28 and 30 can also be altered, as desired, to give many different varieties of mesh patterns for the mesh material 14 other than lattice grids. The mesh material 14 may have, for example, a pattern with relatively large distances between adjacent threads 28 and 30 to allow a large amount of light to pass through and allow a passerby to see through the mesh material 14. In other cases, the mesh material 14 may have relatively small distances between adjacent threads 28 and 30 to allow less light through and provide privacy. Exemplary distances between adjacent threads 28 and 30 can be between $1/32$ and $1/2$ inches.

Figure 2:
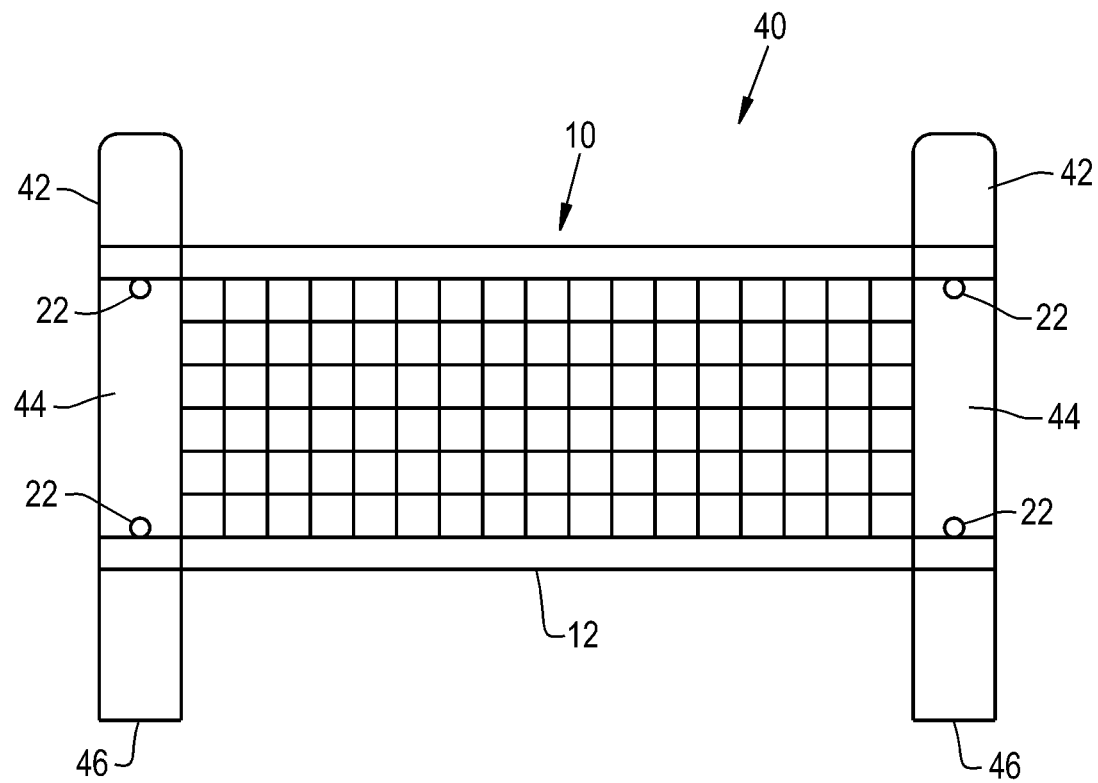
FIG. 2 is a perspective view of an embodiment of a fence formed according to the present invention.

Referring now to FIG. 2, an embodiment of a fence 40 according to the present invention is shown that generally includes two or more fencing poles 42 connected by the fencing material 10 shown in FIG. 1 and previously described. As can be seen, the fencing material 10 is connected to each pole 42 by a joining plate 44 that is attached to the poles 42 by the aforementioned mounting screws 22, which can also extend through the border material 12 of the fencing material 10 to help hold the fencing material 10 in place and taut. The fence 40 can be formed to have a clearance between bottoms 46 of the poles 42 and the bottom edge 18 of the mesh material 14 surrounded by the border material 12 so the bottoms 46 of the poles 42 can be drilled into the ground, but the clearance is optional and may not always be desired. While not shown, the fence 40 can also have a gate or other type of construction that allows access past the fence 40 without having to get over or under the fencing material 10 and poles 42.

Figure 3:
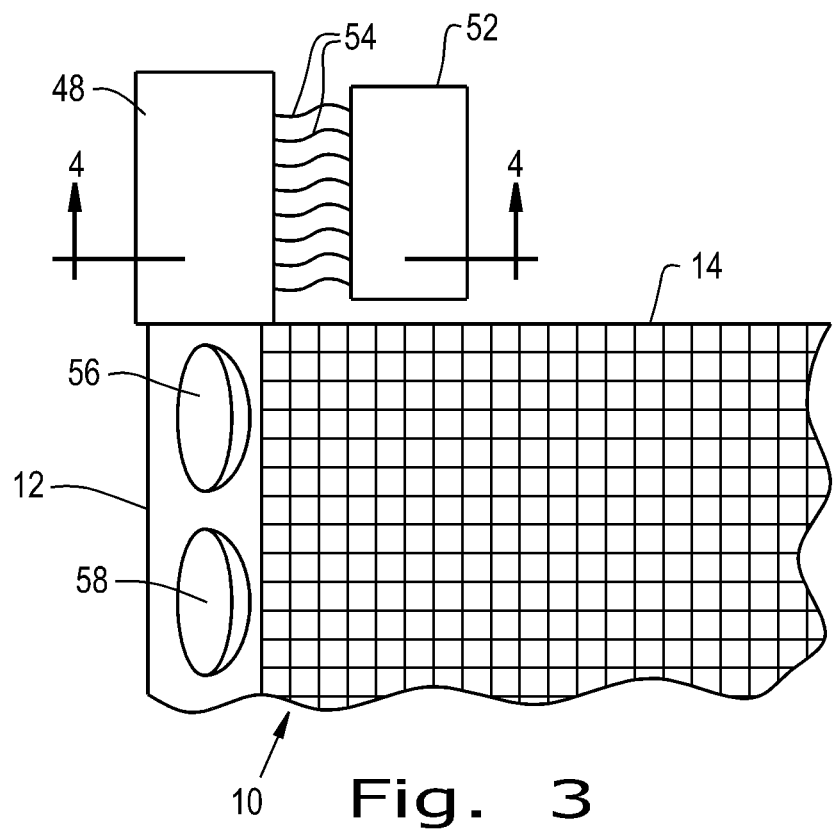
FIG. 3 is a top view of an embodiment of a fencing material being manufactured according to the present invention.

Referring now to FIGS. 3-4, an embodiment of a method of producing the fencing material 10 according to the present invention is shown. As can be seen, the fencing material 10 is being produced in a continuous manufacturing process. The border material 12 can be fed through a guide 48 which will fold the border material 12 into a folded border material, shown in FIG. 4, of roughly two equal halves. Alternatively, the border material 12 can be formed by two strips of border material placed adjacent to or abutting one another rather than by folding a single piece of border material. As the border material 12 is folded, an interior surface 50 of the border material 12 is established which a portion of the mesh material 14, such as the top edge 16 or bottom edge 18, can be placed against.

A treatment unit 52, shown schematically as a rectangle in FIGS. 3 and 4, can treat the border material 12 and/or the mesh material 14 to make the interior surface 50 of the border material 12 a tacky border material surface. The treatment unit 52 can be, for example, a heating unit that directs heated gas, represented by wavy lines 54, toward the interior surface 50 of the border material 12 and mesh material 14 to heat the interior surface 50 and/or the mesh material 14 to a tacking temperature where the border material 12 and/or mesh material 14 is sticky due to being in a partially or completely melted state. The heated gas 54 can be, for example, ambient air. Optionally, the heated air 54 can be dehumidified to remove moisture which can increase the temperature of the heated air 54 needed to treat the materials 12, 14 and slow down the production rate of the fencing material 10. The temperature of the heated air 54 can be altered based on the used border material 12 and/or mesh material 14, as well as the exposure time of the materials 12 and 14 to the heated air 54. For example, a lower heated air temperature may be desired to slowly raise the temperature of the materials 12 and 14 over a longer exposure time as opposed to a higher heated air temperature over a short exposure time. An example heated air temperature may be between 800 to 1600 degrees Fahrenheit, such as 1200 degrees Fahrenheit, with an exposure time of 2 to 15 seconds in order to get the border material 12 and/or the mesh material 14 tacky for bonding when the border material 12 is a vinyl material. It should be appreciated that if a lower temperature is used to make the materials 12, 14 tacky, the exposure time should be increased, and vice versa. Further, the temperature of the heated air and exposure time can vary based on the daily temperature and humidity of the manufacturing facility, as well as the thickness and composition of the materials 12, 14. After the border material 12 and/or mesh material 14 is tacky, the materials 12 and 14 can be thermally bonded together.

Although the treatment unit 52 is described as a heating unit which uses heated gas to heat the materials 12 and 14, the treatment unit can also use other heating methods such as emitting microwaves or infrared light. Alternatively, the treatment unit 52 can be a chemical sprayer which sprays an adhesive or melting agent on the materials 12 and 14 to make the interior surface 50 of the border material 12 a tacky border material surface. The adhesive can be an industrial adhesive compound, such as cyanoacrylates or epoxy, and the melting agent can be a heated liquid. The border material 12 and/or mesh material 14 can also be fed toward the chemical sprayer in an uncured state, with the chemical sprayer applying a curing catalyst to the materials 12 and 14 to allow one or both materials 12, 14 to cure and bond. It should therefore be appreciated that many different types of treatment units 52 can be used to treat the border material 12 and/or mesh material 14 for bonding.

After the interior surface 50 of the border material 12 has been made a tacky border material surface, the tacky border material surface is pressed into the mesh material 12 to form the fencing material 10. One or more rollers 56, 58 can be used to press the tacky border material surface into the mesh material 14, bonding the tacky border material surface to the mesh material 12. The border material 12 and mesh material 14 can be pulled through the rollers 56 and 58 through friction between the rollers 56 and 58 and the border material 12, or a conveyor (not shown) can move the border material 12 and mesh material 14 past the guide 48 to the rollers 56, 58. When the border material 12 is folded so the mesh material 14 is placed between two halves of the border material 12, the rollers 56 and 58 can press the halves of the border material 12 together so that one half of the border material 12 is bonded to the front 24 of the mesh material 14 and the other half of the border material 12 is bonded to the back 26 of the mesh material 14, sandwiching the mesh material 14 in the folded border material 12. The two halves of the border material 12 will also be pressed together, due to spacing between threads of the mesh material 14, to form a tight bond between the border material 12 and the mesh material 14. In this sense, the mesh material 14 is not just bonded to the border material 12, but also held between border material 12 bonded to itself which resides in the spacing formed in the mesh material 14, forming a fencing material 10 with a strong, durable bond between the border material 12 and mesh material 14.

The rollers 56 and 58 can both press on the border material 12 and mesh material 14 with an equivalent pressing pressure, or rollers 56 and 58 can press on the border material 12 and mesh material 14 with different pressing pressures. For example, the first roller 56 that presses on the border material 12 and mesh material 14 can press down with a first pressing pressure which is relatively low, while the second roller 58 presses on the border material 12 and mesh material 14 with a second pressing pressure which is higher or lower than the first pressing pressure. More than two rollers 56, 58 can also be utilized to press the border material 12 and mesh material 14 together, with each successive roller increasing or decreasing in pressing pressure. The pressing pressure(s) applied by the rollers 56, 58 will vary depending on the material composition and thickness, with a wide range of pressures being suitable to bond the border material 12 and mesh material 14 together. The first roller 56 can rotate with a first rotational speed and the second roller 58 can rotate with a second rotational speed that is higher than the first rotational speed in order to stretch the materials 12, 14 as the materials 12, 14 advance from the first roller 56 to the second roller 58, reducing wrinkling of the fencing material 10 in the process.

While FIGS. 3 and 4 only show one edge of the fencing material 10 having the border material 12 bonded to the mesh material 14, the process used to bond the border material 12 to the mesh material 14 can simultaneously occur at the opposite edge of the mesh material 14 if both the top edge 16 and bottom edge 18 of the mesh material 14 are to be bonded to the border material 12. Alternatively, each edge 16, 18 can be bonded to the border material 12 separately, or only one edge 16 or 18 may be bonded to the border material 12.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fencing material, comprising:
    a border material comprising a first polymer and having an interior surface, and said border material is a uniform, folded border material; and
    a mesh material having a front and a back, a portion of at least one of said front and said back being bonded to said interior surface of said border material such that said interior surface of said border material is thermally bonded and pressed into said mesh material, wherein said mesh material is sandwiched in said folded border material, and said folded border material is folded in half, one half of said folded border material being bonded to said front of said mesh material and the other half of said folded border material being bonded to said back of said mesh material, at least some portion of said front and said back of said mesh material are thermally bonded to said interior surface of said border material, said border material comprises a polyvinyl chloride, said mesh material being one of a polyvinyl chloride material and a vinyl coated material.

2. The fencing material according to claim 1, wherein said mesh material comprises a second polymer different from said first polymer of said border material.

3. The fencing material according to claim 1, wherein said mesh material is a cloth material.

4. The fencing material according to claim 1, wherein said mesh material is a vinyl-coated cloth material.

5. The fencing material according to claim 1, wherein said border material covers an edge of said mesh material.

6. A fence, comprising:
    at least two fencing poles; and
    a fencing material connected to said at least two fencing poles, said fencing material comprising:
        a border material comprising a first polymer and having an interior surface, and said border material is a uniform, folded border material; and
        a mesh material having a front and a back, a portion of at least one of said front and said back being bonded to said interior surface of said border material such that said interior surface of said border material is thermally bonded and pressed into said mesh material, wherein said mesh material is sandwiched in said folded border material, and said folded border material is folded in half, one half of said folded border material being bonded to said front of said mesh material and the other half of said folded border material being bonded to said back of said mesh material, at least some portion of said front and said back of said mesh material are thermally bonded to said interior surface of said border material, said border material comprises a polyvinyl chloride, said mesh is one of a polyvinyl chloride material and a vinyl coated material.

7. The fence according to claim 6, wherein said mesh material comprises a second polymer different from said first polymer of said border material.

8. The fence according to claim 6, wherein said fencing material is connected to at least one of said fencing poles by a joining plate.

9. The fence according to claim 6, wherein said mesh material is a cloth material.

10. The fence according to claim 6, wherein said mesh material is a vinyl-coated cloth material.

11. The fence according to claim 6, wherein said border material covers an edge of said mesh material.

* * * * *